United States Patent [19]

Edwards

[11] 4,427,833

[45] Jan. 24, 1984

[54] POLYETHYLENE EXTRUSION COATING COMPOSITIONS

[75] Inventor: Ray Edwards, Henderson, Tex.

[73] Assignee: Eastman Kodak Company, Rochester, N.Y.

[21] Appl. No.: 359,977

[22] Filed: Mar. 19, 1982

[51] Int. Cl.³ .............................................. C08F 36/16
[52] U.S. Cl. .................................. 525/240; 526/352.2
[58] Field of Search ...................... 525/240; 526/352.2

[56] References Cited

U.S. PATENT DOCUMENTS 3,694,524  9/1972  Tinger et al. ........................ 525/240
3,998,914  12/1976  Lillis et al. ........................... 525/240
4,169,929  10/1979  Buechner et al. ................. 526/352.2

Primary Examiner—Maurice J. Welsh
Attorney, Agent, or Firm—Clyde L. Tootle; Daniel B. Reece, III

[57] ABSTRACT

This invention relates to low density polyethylene extrusion coating compositions which provide coatings having good coatability and a broad heat seal range. The coated substrates can be used in fabricating bags and other packaging applications. These unique extrusion coatings are provided by a low density polyethylene having a density of 0.916 to 0.926, a melt index of 0.1 to 2.0 and a swell ratio of less than 1.5.

4 Claims, No Drawings

POLYETHYLENE EXTRUSION COATING COMPOSITIONS

DESCRIPTION

This invention relates to particular low density polyethylene extrusion coating compositions providing coatings having good coatability and a broad heat seal range. These low density polyethylene extrusion coatings due to the good coatability and a broad heat seal range are useful in fabricating packaging applications. These novel extrusion coating compositions can contain a single low density polyethylene which forms extrusion coatings on substrates which have good adhesion to the substrate as well as other excellent physical properties.

Extruding a coating of a polyolefin or blends of polyolefins onto a substrate, such as paper or aluminum foil, to form an extrusion coated substrate is well known in the art. Various blends of polyethylenes and other polyolefins have been widely used as extrusion coating compositions. Heretofore, in order to provide satisfactory extrusion coating compositions useful in commercial applications to provide thin coatings at high coating speeds it has been necessary to employ blends of two or more components. Furthermore, these blends have to be prepared from polyolefins having specific properties to prepare blends having specific blend properties in order to satisfactorily coat substrates. However, even though these blends may provide satisfactory coatings, these coating compositions when applied to substrates, such as paper, do not provide the parameter of properties required such as good barrier properties and heat seal strength for preparing packaging materials. Heretofore, one component polyethylene coating compositions having a melt index of less than 2 have not been considered by the art as useful extrusion coating compositions because it has been shown that such materials do not coat at common commercially acceptable coating speeds to provide thin coatings (i.e. less than 0.0254 mm) for such uses as sugar packet coatings. Therefore, it was completely unexpected to find that a polyethylene having a density of 0.916 to 0.926, melt index of 0.1 to 2 in combination with a swell ratio of less than 1.5 would provide an acceptable extrusion coating composition. Moreover, it was completely unexpected to find that such low density polyethylene extrusion coating compositions can contain only one low density polyethylene.

In accordance with this invention, low density polyethylene extrusion coating compositions are provided having good coatability and a broad heat seal range. Such compositions are obtained using a low density polyethylene having a density of 0.916 to 0.926, a melt index of 0.1 to 2.0 and a swell ratio of less than 1.50. These extrusion coating compositions provide a coating composition that has excellent adhesion to the substrate as well as other desirable properties. Also, the coatings must be able to provide a coated substrate at line speeds of at least 4 meters/second, preferably 5-7 meters/second. These thin coatings have, in addition to other desirable properties, a broad heat seal range, good barrier properties and good adhesion retention characteristics. Such properties are useful in the construction of food packaging materials. In addition to thin coatings having good adhesion and barrier properties, the thin coating must be applied to a thickness of less than 0.0254 mm cutting or less. Coatings thicker than 0.0254 mm cutting are uneconomical commercially in most packaging or coating applications.

The coating compositions of this invention provide coatings on substrates, such as paper stock, kraft paper, and primed aluminum foils which are useful in fabricating packages. These coated substrates have sufficient substrate adhesion to be useful in applications where handling or flexibility is encountered. For example, such coated substrates can be used to form packages, for example, for water activated chemicals such as denture cleaners, headache and upset stomach nonprescription medicines, packages for foods such as sugar packets, and the like.

The polyethylene component of the coating composition must have a melt index at 190° C. of 0.1 to 2.0, preferably 1.4 to 1.7, a density of above about 0.916 to 0.926 and a swell ratio of less than 1.5, preferably about 1.4. Low melt index polyethylenes having a swell ratio greater than 1.5 do not provide thin coatings of less than 0.0254 mm having good neck-in properties at commercially acceptable line speeds. Polyethylene coating compositions having the defined parameter of properties can preferably be a single polyethylene composition or a blend of polyethylenes which blend has the defined parameter of properties. Preferably, however, a single polyethylene is used because a blend would require blending the two or more polyethylenes thereby resulting in additional processing which is both expensive and time consuming. Also, this additional processing would require that the blend be heated to allow blending to take place which can cause degradation and adversely affect the resulting physical properties of the resulting coating. Such polyethylenes useful in this invention are prepared by methods known to the art. Also, the extrusion coating compositions can be prepared and applied by methods known to the art.

Additives, fillers and the like can be added to the compositions of the present invention. Such materials can be present in the components forming the polymer blend, or may be added during the extrusion coating operation.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

An extrusion coating composition using as the only polyolefin component a low density polyethylene having a melt index of 1.7 dg/min at 190° C. density of 0.921 g/cc (ASTM D-1505) and a swell ratio of 1.42. Swell ratio is defined as the ratio of the diameter of the extrudate over that of the orifice diameter of the extrusion plastometer in ASTM Designation D1238-62T. The diameter of the specimen is measured in the area between 0.159 cm and 0.952 cm of the initial portion of the specimen as it emerges from the extrusion plastometer. Measurements are made by standard methods according to ASTM Designation D-374.

This polyethylene was evaluated as follows: the polyethylene was fed to an 8.89-cm Egan extruder having a barrel length to diameter ratio of 24:1. The four zones of the extruder were maintained, from back to front, at 215° C., 260° C., 316° C., and 350° C. A metering type screw having six compression flights, and 12 metering flights were used. Prior to entering the die the melt passed through one screen of 9×9 strands per square cm mesh. The die was an Egan die, center-fed with 1.3 cm long lands, with an opening of 40.6 cm×0.51 mm. The temperature of the die was held at 316° C. The extrusion rate was held constant at 20 g/sec. The resulting film extrudate was passed through a 11.4-cm air gap into the nip formed by a rubber-covered pressure roll and a chill roll. At the same time, 65.2 g/m² kraft paper stock 40.6 cm wide was fed into the nip with the pressure roll in contact with the foil. The nip pressure applied was $2 \times 10^4$ g/cm. The chill roll was a 61 cm diameter matte finish steel roll, water cooled to maintain a temperature of 15° C. on the roll. The coated paper was taken off the chill roll at a point 180° from the nip formed by the pressure roll and chill roll. The chill roll was operated at linear speeds of about 4 m/sec. to greater than 7 m/sec. which is the accepted range for commercial extrusion coatings. For example, at a coating speed of 7 m/sec. the paper stock had a coating of about 0.0076 mm. The coating had an excellent adhesion to the paper stock. This example shows that this single polyethylene material provides a high speed extrusion coating having a 0.0076 mm thickness which is an excellent extrusion coating composition at a very high coating speed. The coating also had an excellent impact strength of 100 grams (ASTM D-1709). The coating also had a heat seal range of 4 to 12 seconds and good pinhole resistance properties. This polyethylene coating also had greater stress crack properties (ASTM D-1693-70) and was superior to those polyethylene blends having higher melt index than 2. Stress crack resistance is most important in photographic print coatings to prevent crazing and in the packaging of certain products such as soaps and alcohols.

EXAMPLE 2

An extrusion coating was prepared and tested according to Example 1 except that a low density polyethylene having a density of 0.922, a melt index of 0.35 and a swell ratio of 1.30 was used. The composition was extrusion coated satisfactorily at extrusion speeds as fast as 4 m/sec. and formed coatings of 0.015 mm thick. This shows that a polyethylene with a melt index of 0.35 and a swell ratio of 1.30 will perform satisfactorily.

EXAMPLE 3

An extrusion coating was prepared and tested according to Example 1 except that a low density polyethylene having a density of 0.917, a melt index of 1.7 and a swell ratio of 1.62 was used. The composition was extrusion coated to kraft paper satisfactorily at a speed of only 1.4 m/sec. to provide coatings of 0.046 mm. This example shows that a polyethylene having a melt index of 1.7 but a swell ratio of 1.62 is not desirable due to slow line speeds and the inability to coat to 0.0254 mm and less. At speeds greater than 1.5 m/sec. this coating had excessive edge tear and nonuniform coatings over the width of the substrate.

EXAMPLE 4

An extrusion coating was prepared and tested according to Example 1 except that a low density polyethylene having a density of 0.925, a melt index of 4.2 and a swell ratio of 1.60 was used. The composition was extrusion coated satisfactorily at extrusion speeds of greater than 7 m/sec. and formed coatings of 0.0076 mm in thickness. This example shows that, for melt indexes above 2, swell ratios greater than 1.50 are needed to coat to 0.0254 mm and less.

EXAMPLE 5

An extrusion coating was prepared and tested according to Example 1 except that a low density polyethylene having a density of 0.917, a melt index of 3.5 and a swell ratio of 1.62 was used. The composition was extrusion coated to kraft paper satisfactorily at a speed of only 3 m/sec. to provide coatings of 0.0254 mm. This example shows that lowering the melt index from the previous example to 3.5 required that the swell ratio be higher than 1.5 to provide satisfactory coatings but at a much slower coating speed.

EXAMPLE 6

An extrusion coating was prepared and tested according to Example 1 except that a low density polyethylene having a density of 0.918, a melt index of 0.38 and a swell ratio of 1.60 was used. The composition was extrusion coated at extrusion speeds of only 0.4 m/sec. and formed coatings of 0.13 mm in thickness. This example shows that increasing only the swell ratio of the polyethylene to 1.60 provides an unacceptable coating composition due to poor coating speeds and coatings having a thickness of greater than 0.0254 mm. This example shows that a polyethylene having a density of 0.916 to 0.926 and a melt index of 0.1 to 2.0 but having a swell ratio of greater than 1.5 is an unacceptable coating composition.

These extrusion coating compositions provide good coatings to substrates such as paper stock, Kraft paper, primed metal foils such as aluminum and the like. The coated substrates find utility in food packaging, medicine packing or other well known uses.

The invention has been described in detail with particular reference to preferred embodiments thereof, but it will be understood that variations and modifications can be effected within the spirit and scope thereof.

I claim:

1. An extrusion coating composition capable of providing a coating having a thickness of about 0.0254 mm or less at coating speeds of at least 4 meters per second consisting essentially of a polyethylene component comprising low density polyethylene having a density of 0.916 to 0.926, a melt index at 190° C. of 0.1 to 2.0, and a swell ratio of less than 1.50.

2. An extrusion coating composition according to claim 1 wherein said low density polyethylene has a melt index at 190° C. of 1.4 to 1.7.

3. An extrusion coating composition according to claim 2 wherein said low density polyethylene also has a swell ratio of about 1.4.

4. An extrusion coating composition capable of providing a thickness of about 0.0254 mm or less at coating speeds of about 7 meters per second consisting essentially of a polyethylene component comprising low density polyethylene having a density of about 0.921, a melt index at 190° C. of about 1.7 and a swell ratio of about 1.42.

* * * * *